(12) United States Patent
Laughlin-Parker et al.

(10) Patent No.: US 8,217,804 B2
(45) Date of Patent: Jul. 10, 2012

(54) HIGH POWER AMR TRANSMITTER WITH DATA PROFILING FOR MOBILE NETWORKS

(75) Inventors: Kelly Laughlin-Parker, Waukesha, WI (US); John Fillinger, Jr., Germantown, WI (US)

(73) Assignee: Badger Meter, Inc., Milwaukee, WI (US)

( * ) Notice: Subject to any disclaimer, the term of this patent is extended or adjusted under 35 U.S.C. 154(b) by 900 days.

(21) Appl. No.: 11/701,792

(22) Filed: Feb. 2, 2007

(65) Prior Publication Data

US 2008/0186200 A1 Aug. 7, 2008

(51) Int. Cl.
G08C 15/06 (2006.01)
(52) U.S. Cl. .......... 340/870.02; 340/870.03; 340/870.18
(58) Field of Classification Search ............. 340/870.18, 340/870.02, 870.03
See application file for complete search history.

(56) References Cited

U.S. PATENT DOCUMENTS

| | | | | |
|---|---|---|---|---|
| 4,724,435 A | * | 2/1988 | Moses et al. ............. | 340/870.13 |
| 4,801,937 A | * | 1/1989 | Fernandes ................ | 340/870.16 |
| 4,940,976 A | * | 7/1990 | Gastouniotis et al. ... | 340/870.02 |
| 5,307,372 A | * | 4/1994 | Sawyer et al. ............ | 375/133 |
| 5,428,351 A | * | 6/1995 | Lee et al. ................. | 340/870.02 |
| 5,432,507 A | * | 7/1995 | Mussino et al. ......... | 340/870.03 |
| 5,438,329 A | * | 8/1995 | Gastouniotis et al. ... | 340/870.02 |
| 5,477,216 A | * | 12/1995 | Lee et al. ................. | 340/870.02 |
| 5,546,318 A | * | 8/1996 | Lee, Jr. ..................... | 702/61 |
| 5,617,084 A | * | 4/1997 | Sears ....................... | 340/870.02 |
| 5,699,276 A | * | 12/1997 | Roos ........................ | 379/106.03 |
| 5,731,526 A | * | 3/1998 | Kindrick .................. | 73/861 |
| 5,748,103 A | * | 5/1998 | Flach et al. ............. | 340/870.07 |
| 5,748,104 A | * | 5/1998 | Argyroudis et al. ..... | 340/870.11 |
| 6,195,018 B1 | | 2/2001 | Ragle et al. | |
| 6,710,721 B1 | * | 3/2004 | Holowick ................ | 340/870.02 |
| 6,755,148 B2 | | 6/2004 | Holowick | |
| 6,798,352 B2 | | 9/2004 | Holowick | |
| 6,888,876 B1 | | 5/2005 | Mason, Jr. et al. | |
| 7,417,557 B2 | * | 8/2008 | Osterloh et al. ......... | 340/870.03 |
| 7,498,953 B2 | * | 3/2009 | Salser et al. ............. | 340/870.02 |
| 7,535,378 B2 | * | 5/2009 | Cornwall ................. | 340/870.02 |
| 7,605,717 B2 | * | 10/2009 | Olson et al. ............. | 340/870.02 |
| 2001/0038342 A1 | * | 11/2001 | Foote ....................... | 340/870.02 |
| 2002/0039068 A1 | * | 4/2002 | Holowick ................ | 340/870.02 |
| 2003/0080876 A1 | | 5/2003 | Martin | |
| 2005/0068193 A1 | * | 3/2005 | Osterloh et al. ......... | 340/870.02 |
| 2005/0225455 A1 | | 10/2005 | Patterson et al. | |
| 2006/0028355 A1 | * | 2/2006 | Patterson et al. ........ | 340/870.02 |
| 2006/0031180 A1 | | 2/2006 | Tamarkin | |
| 2006/0158347 A1 | * | 7/2006 | Roche et al. ............. | 340/870.02 |
| 2006/0220903 A1 | * | 10/2006 | Zigdon et al. ............ | 340/870.02 |
| 2007/0013547 A1 | | 1/2007 | Boaz | |
| 2007/0252722 A1 | * | 11/2007 | Zigdon et al. ............ | 340/870.03 |

(Continued)

OTHER PUBLICATIONS

ORION Automated Meter Reading System, Installation & Operation Manual, Badger Meter, Inc.; Rev. 1, Sep. 2005; pp. 1-49.

(Continued)

*Primary Examiner* — Timothy Edwards, Jr.
(74) *Attorney, Agent, or Firm* — Boyle Fredrickson, S.C.

(57) ABSTRACT

The invention provides a method and circuitry for transmitting signals in a frequency-hopping, spread-spectrum, AMR network using mobile receivers operating at greater than 1 milliwatt and providing data profiling data to be read out through an I/O port or transmitted over the RF network, which may use one-way or two-way communication.

29 Claims, 3 Drawing Sheets

U.S. PATENT DOCUMENTS

| | | | |
|---|---|---|---|
| 2008/0026747 A1* | 1/2008 | Navarro et al. | 455/426.1 |
| 2008/0177678 A1 | 7/2008 | Di Martini | |
| 2008/0272933 A1* | 11/2008 | Cahill-O'Brien et al. | 340/870.02 |
| 2008/0316051 A1* | 12/2008 | Salser et al. | 340/870.02 |

OTHER PUBLICATIONS

Datamatic—FIREFLY Automatic Meter Reader for Water, http://www.datamatic.com/firefly_water.html, Oct. 15, 2004, pp. 1-3.

Datamatic—ProfilePLUS Applications for Water, http://www.datamatic.com/profileplus_water.html, Oct. 15, 2004, pp. 1-2.

Datamatic—RouteSTAR MVP, http://www.datamatic.com/routestar.html, Oct. 15, 2004, pp. 1-2.

Datamatic—FIREFLY Automatic Meter Reading System data sheet.

Datamatic—FIREFLY Logical Switch for Master Meter registers data sheet.

Datamatic—Specifications data sheet.

Datamatic—RouteSTAR MVP Enterprise Meter Reading System, 2 data sheets.

Datamatic—Profile PLUS Applications data sheet.

Datamatic—CommStar MDx C& I Data Collection System, 2 data sheets.

Osborne, Adam; "An Introduction to Microcomputers"; vol. 1 Basic Concepts, Osborne/McGraw-Hill, Berkeley, California; Copyright 1980, p. 4-12.

* cited by examiner

HIGH POWER AMR TRANSMITTER WITH DATA PROFILING FOR MOBILE NETWORKS

TECHNICAL FIELD

This invention relates to automatic meter reading (AMR) systems, and in particular to utility meters using a radio transmitter for transmitting metering data signals to a radio receiver in a network for collecting utility metering data.

DESCRIPTION OF THE BACKGROUND ART

Cerny et al., U.S. Pat. No. 5,298,894, discloses a mobile automatic meter reading (AMR) system in which a utility meter transmitter receives signals from a signal transducer insta;;ed on a utility meter and transimits radio frequency (RF) meter data signals to an RF collection unit in a drive-by vehicle. In these mobile AMR systems, a vehicle or a person on foot with an RF collection unit (a walk- by collection system) can move through a neighborhood and collect a large number of readings per hour without entering any of the property of the customers.

Mobile collection units and their associated transmitters have operated in an ISM (Industrial, Scientific and Medical) frequency band around 915 Mhz, since these bands are available nationwide and do not require a license. For these units, transmissions are inly required to reach distances of a few hundred feet, but must be sent out frequently to be available for a drive-by or walk-by collection unit at random times of collection. The unlicensed band is in a narrow range of the radio frequency spectrum, where power associated with the transmission signals is limited to 1 milliwatt, to prevent interference in various areas where the equipment is operating with other RF signals in the enviroment.

Patterson, U.S. Pat. Pub. No. 2005/0225455 discloses a narrow band transmitter with data profiling capability in which the transmitter operates at no more than 1 milliwatt. This was deemed advantageous for operation in a band not requiring FCC licensing and in a transmitter suitable for walk-by and drive-by reception of data from the transmitter.

Data profiling capability is desirable because it collects data at selected usage intervals and provides a record of data usage over many such intervals which provide a data profile to resolve various issues that may arise in the use of the equipment. This function has been carried out by modules separate from the AMR transmitter but located in the vicinity of the AMR transmitter. These are referred to as remote data profiling modules. This function has also been carried out by circuitry incorporated in a transmitter unit and these assemblies are often referred to as "integrated" or "integral" data profiling modules.

Fixed networks, as compared to networks using mobile collection units, transmit signals over distances of more than 1,000 feet and up to distances of one-half mile or more. Fixed network transmitters typically utilize a frequency-hopping, spread-spectrum type of transmission, which by regulation is permitted to use transmitter power up to one (1) watt, which is 1000 times greater than 1 mW limit for narrow band systems.

Today many new home constructions are larger than they were even 10 or 20 years ago. With meters located behind such homes or behind commercial buildings, the automatic reading of these meters with radio equipment is difficult for low power narrow band radios. The use of a higher power transmitter would improve the efficiency of reading of these meters.

It is therefore desirable to provide a higher power transmitter for mobile collection systems that will not be subject to the limitations of the prior art.

SUMMARY OF THE INVENTION

The invention provides a method and circuitry for transmitting AMR signals from a higher power transmitter to a mobile collection unit, and also providing for accumulation of data profiling data for collection in various ways described in this specification.

The method more particularly comprises transmitting a first plurality of signals representing meter data at a power of greater than 1 milliwatt up to and including 1 watt.

The utility usage data is determined and stored at first intervals of less than one day, and typically one hour or less. These utility usage data are accumulated over a data profiling period of days, weeks or months for viewing by a service person.

The method more particularly comprises: receiving a plurality of signals representing meter reading data from a utility meter signal source; determining utility meter usage over data intervals; storing the utility usage data at data intervals within a longer data profiling interval; reading out the data profiling data on demand; and transmitting a plurality of radio frequency meter reading data signals at a power level that is greater than 1 milliwatt.

The invention also relates to transmitter circuitry for carrying out the method of the invention the utility meter transmitter unit comprising: a metering signal section for receiving a plurality of signals representing meter reading data from a metering signal source; an arithmetic section for determining utility meter usage over data intervals; a storage section for storing the utility usage data corresponding to a data interval within a longer data profiling interval; a port for reading out the utility usage data corresponding to a data profiling interval; and transmitter circuitry capable of transmitting a first plurality of radio frequency meter reading signals at a power level that is greater than 1 milliwatt.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENTS

Figure 1:
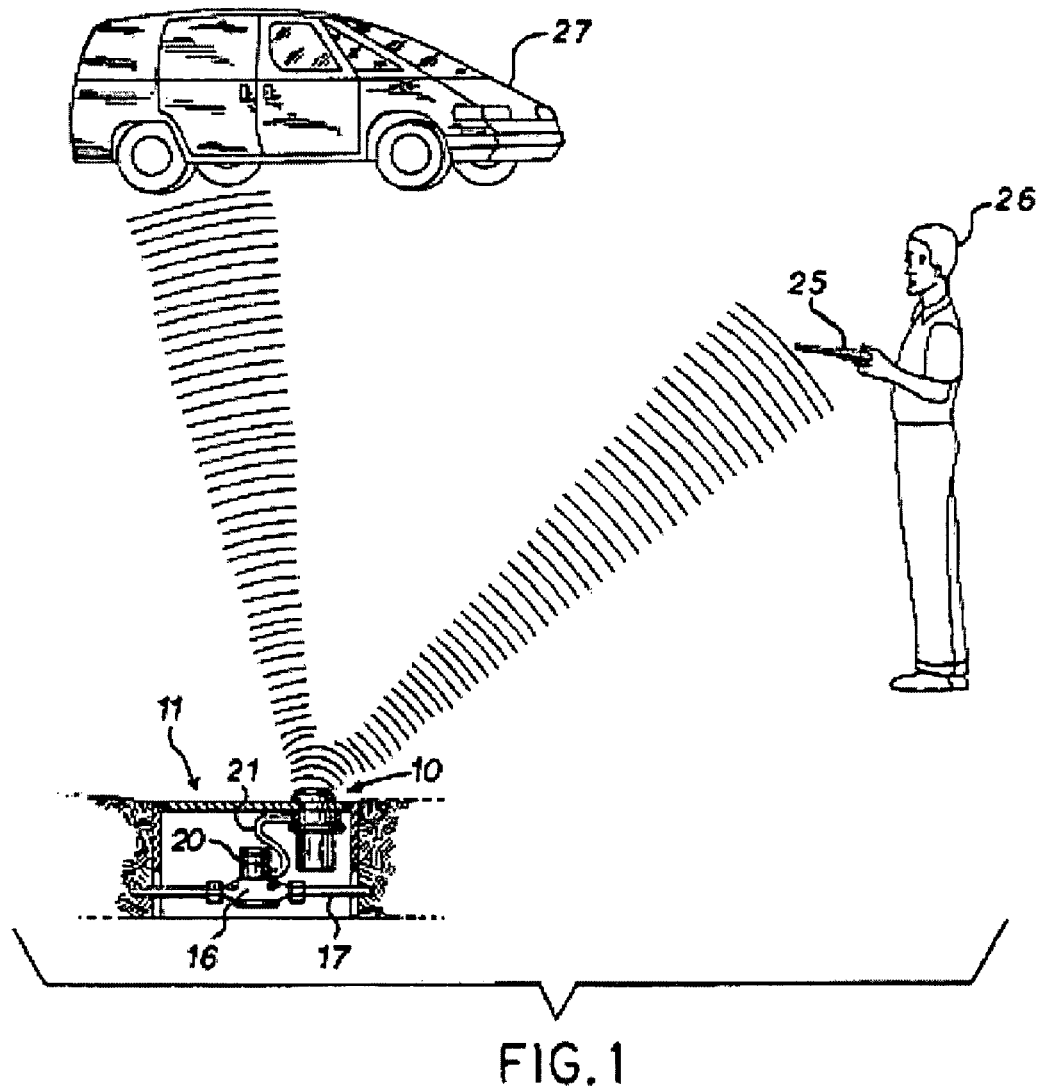
FIG. 1 is a perspective view of an AMR system with walk-by and drive-by mobile receivers for receiving transmissions from a transmitter associated with a utility meter.

Referring to FIG. 1, one example of an environment of the invention is provided by a subsurface pit enclosure 11. The pit is typically made of metal, concrete, plastic or other materials and a lid which is removable to open the enclosure 11 for access. The pit enclosure 11 is located along the route of water supply pipe 17. A water meter housing 16 is connected in the water supply line 17. A water meter register unit 20 is mounted on top of the water meter housing 16. As known in the art, a mechanism within the meter registers converts mechanical movements of a meter to visual and numerical representations of consumption often shown in an odometer type read-out device. The register 20 is preferably a unit that is commercially distributed by Badger Meter, Inc., the assignee of the present invention, under the trade designation "Recordall" Transmitter Register (RTR). Besides displaying units of consumption, this device 20 uses a transducer that is described in Strobel et al., U.S. Pat. No. 4,868,566, entitled "Flexible Piezoelectric Switch Activated Metering Pulse Generators," to convert the mechanical movements of the meter to electrical signals. Other metering transducers known in the art and using optics and an analog-to-digital encoder (ADE) circuit can also be used to send metering data signals from the register 20.

The register 20 connects via a shielded cable 21 to a transmitter assembly 10, which is housed in a tubular housing of plastic material that hangs down from the pit lid. The register 20 transmits electrical signals to the transmitter assembly 10, for further transmission through a radio network. Besides the cable 21, it is also known in the art to transmit these signals wirelessly to an antenna mounted in the pit lid as well.

The transmitter assembly 10 communicates via low power RF signals with a receiver which can be a mobile receiver (not shown) in a vehicle 27 or a handheld receiver 25 carried by a service person 26. The pit transmitter assembly 10 transmits a plurality of signals making up an electronic message that includes an identification code, meter reading data, and an error code for checking the data at the receiving end. The meter data is collected from various customer locations for billing purposes.

Figure 2:
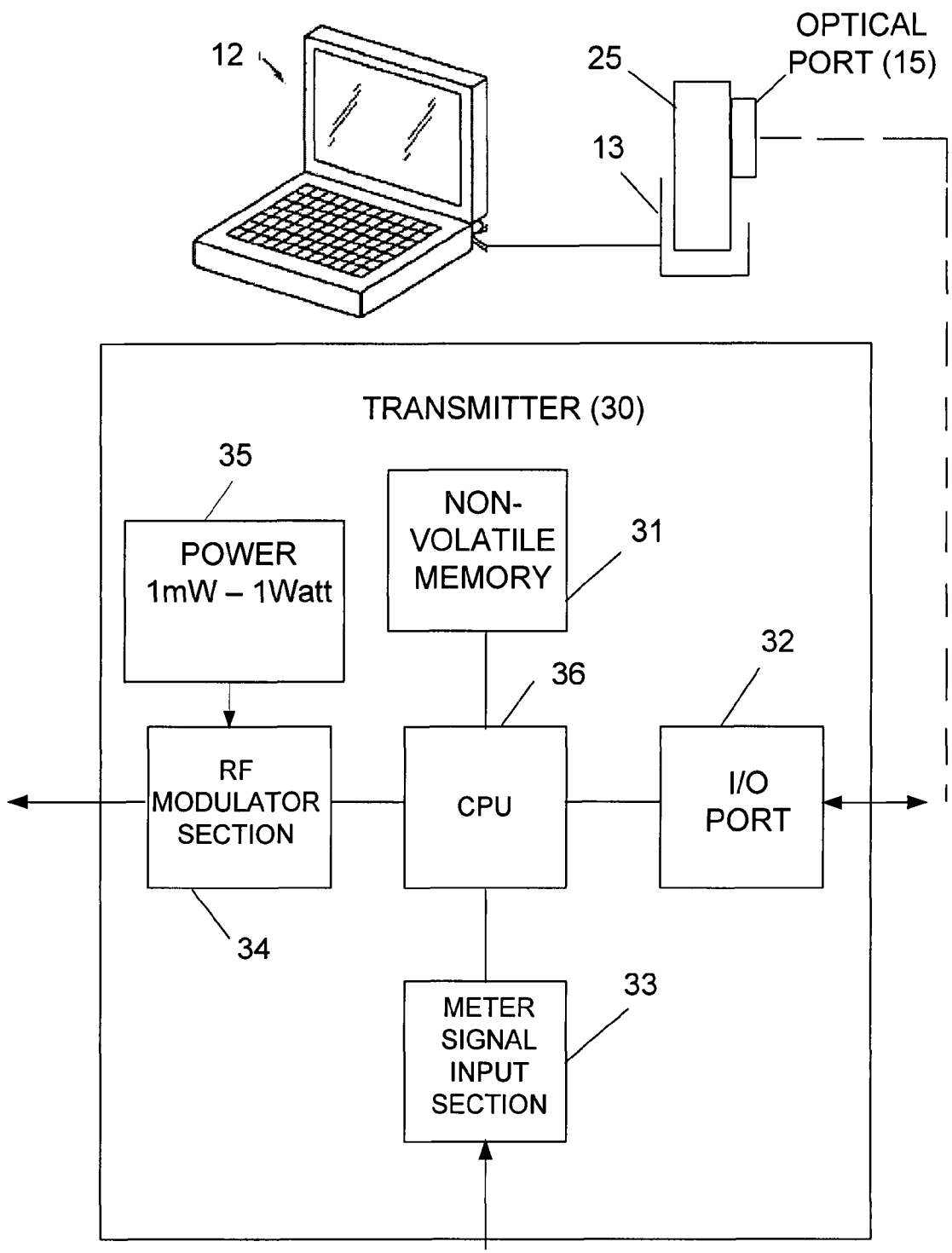
FIG. 2 is a block diagram of a metering data transmitter including a memory for storing meter usage data for data profiling.

Referring to FIG. 2, a utility data transmitter unit 30 inside transmitter assembly 10 includes an electrical circuit typically formed on a circuit board and including a microelectronic CPU 36 operating according to a control program stored in a program memory 31, which in this case is an a non-volatile memory, such as an EEPROM. The memory is non-volatile in that it can only be altered with a special programming unit, which communicates with the transmitter through an optical I/O port 32.

As further seen in FIG. 2, the CPU 36 receives metering data signals from a metering transducer mentioned above through a meter signal input section 33. This input section 33 can receive a pulse input or an input from an analog-to-digital encoder (ADE) circuit of a type known in the art. The input section 33 then transmits these signals to the CPU 36. The CPU 36 then transmits these signals as metering data signals in a message protocol, which is converted to radio frequency (RF) signals by an RF modulator section 34.

The distance between the meter with the meter register to the transmitter ranges from a foot or less to greater distances considered to be in the same "local area" which shall encompass a range up to about 250 feet.

The utility data transmitter unit 30 operates in one of two modes of operation, one-way or bidirectional. In the one-way mode, the transmitter unit "wakes up" periodically to transmit metering data to any compatible mobile collector within range. It would be desirable to provide a transmitter for mobile systems of the type used for fixed network systems utilizing a higher power level. In the present invention, this is accomplished by transmitting a frequency-hopping spread-spectrum mode of operation, which is the subject of different FCC regulations permitting a higher power level. This power level is limited to ¼ watt for a number of channels from 25 to 50 channels and to one (1) watt for systems utilizing at least 50 channels. In the present embodiment, the lower number of channels and the lower power limit is selected, but in other embodiments of the invention the higher number of channels can be used to further utilize the higher power limit. A power supply section 35 of the utility data transmitter unit 30 supplies the necessary power to the RF modulator section 34 as well as to other components of the transmitter unit 30.

FIG. 2 also shows a handheld collection unit 25 of a type offered under the trade designation Badger-Radix that can be used to both collect metering data through RF signals and can also read data profiling data through an optical or touch type port 15 and I/O port 32 on the transmitter unit 30 that can also be optical, including a port for transmitting and receiving signals in the infrared frequency range, or another type of RF communication port. The handheld unit 25 is placed in a cradle 13 that includes an electrical connector that allows data to be exchanged with a computer 12 running a Windows® operating system.

It is also possible to collect data profiling data through the same RF messages used to transmit metering data, provided that a two-way protocol is used to request the data profiling data.

Figure 3:
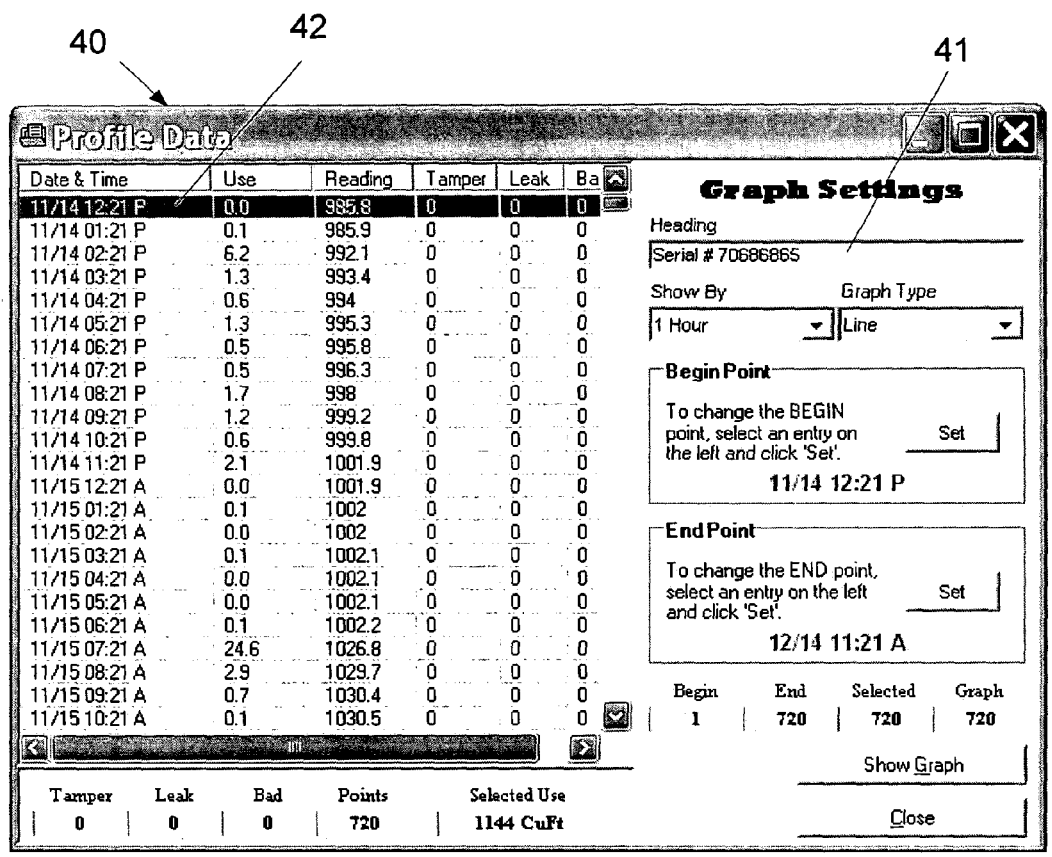
FIG. 3 is a screen display of a data profile of utility usage data.

Referring to FIG. 3, a data profile has been downloaded to the computer 12 and is displayed in a screen display 40 comprising a window with a table have usage periods 42 of one hour in duration over a 22-hour time period. The usage numbers are given in numbers such as 0.1, 6.2, 1.3 and these are determined from the reading numbers. The usage numbers can be determined either by an arithmetic section in the CPU 36 or by using a separate usage counter within the CPU 36. The data profile can be displayed in tabular or graphical form, including a bar graph. The table shown in FIG. 3 relates to one transmitter which is identified by serial number in data window 41.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A water meter transmitter unit for use in an automatic meter reading network to communicate with a mobile network receiver, the water meter transmitter unit comprising:
   a meter signal input section for receiving a plurality of signals representing meter reading data from a water metering signal source within a local area;
   an arithmetic section for determining water usage data over data intervals from the plurality of signals received through the meter signal input section;
   a storage section for storing the water usage data corresponding to a data interval within a longer data profiling interval;
   a port for reading out the water usage data corresponding to a data profiling interval;
   transmitter circuitry configured for transmitting a first plurality of radio frequency meter reading signals at a power level that is greater than 1 milliwatt to the mobile network receiver; and
   wherein the transmitter is operated at a power level that is within a range from greater than 1 milliwatt up to and including one watt, with power being received from a power source that is self-contained within the water meter transmitter unit.

2. The water meter transmitter unit as recited in claim 1, wherein the transmitter circuitry transmits the radio frequency meter reading signals in a frequency hopping, spread spectrum mode of transmission.

3. The water meter transmitter unit as recited in claim 1, wherein the data intervals each represent a variable amount of consumption over a fixed time interval.

4. The water meter transmitter unit as recited in claim 1, wherein the data intervals each represents a fixed amount of consumption over a variable time interval.

5. The water meter transmitter unit as recited in claim 1, wherein the port is an optical I/O port.

6. The water meter transmitter unit recited in claim 5, wherein the port is a port for transmitting and receiving signals in the infrared frequency range.

7. The water meter transmitter unit as recited in claim 1, wherein
the arithmetic section includes a CPU operating according a stored control program; and
wherein the storage section includes a nonvolatile memory.

8. A method of collecting and transmitting water metering data in a meter reading network including a mobile network receiver, the method comprising:
receiving a plurality of signals representing meter reading data from a utility meter signal source at a metering site, wherein the utility meter is a water meter;
determining water usage data over data intervals from the plurality of signals received from a utility meter signal source over the data intervals;
storing the water usage data at data intervals within a longer data profiling interval to provide data profiling data;
reading out the data profiling data on demand; and
transmitting a plurality of radio frequency meter reading data signals from the metering site at a power level that is greater than 1 milliwatt for reception by the mobile network receiver; and
receiving power from a power source that is self-contained within a water meter transmitter unit, wherein the power required for operation of the transmitter is in a range from greater than 1 milliwatt, up to and including one watt.

9. The method as recited in claim 8, wherein the plurality of radio frequency meter reading data signals are transmitted in a frequency-hopping, spread-spectrum mode of transmission.

10. The method as recited in claim 8, wherein the power level for transmitting radio frequency meter reading data signals is in a range from 1 milliwatt to one watt.

11. The method as recited in claim 10, wherein the transmitter transmits the radio frequency meter reading data signals as a plurality of frequency hopping, spread spectrum signals.

12. The method as recited in claim 8, wherein the data intervals each represent a variable amount of consumption over a fixed time interval.

13. The method as recited in claim 8, wherein the data intervals each represents a fixed amount of consumption over a variable time interval.

14. The method as recited in claim 8, wherein the data profiling data is accessed through an optical I/O port.

15. The method as recited in claim 8, wherein communication is two-way and wherein the data profiling data is accessed through a message sent to a radio frequency transceiver unit and, in response, is provided in a return message.

16. The method as recited in claim 8, wherein
the water usage is determined by a CPU operating according a stored control program; and
wherein the water usage data is stored in a nonvolatile memory.

17. The water meter transmitter unit as recited in claim 2, wherein the plurality of radio frequency meter reading data signals are transmitted by the transmitter circuitry in a frequency-hopping, spread-spectrum mode of transmission for a number of channels from 25 to 50 channels at power level above 1 milliwatt but no greater than ¼ watt.

18. The water meter transmitter unit as recited in claim 17, wherein the communication of data is one-way from utility meter transmitter unit to the mobile network receiver.

19. The method as recited in claim 11, wherein the plurality of radio frequency meter reading data signals are transmitted by a transmitter in a frequency-hopping, spread-spectrum mode of transmission for a number of channels from 25 to 50 channels at power level above 1 milliwatt but no greater than ¼ watt.

20. The method as recited in claim 19, wherein the communication of data is one-way from the metering site to the mobile network receiver.

21. A water meter transmitter unit for use in an automatic meter reading network including a mobile network receiver, the utility meter transmitter unit comprising:
a meter signal input means for receiving a plurality of signals representing meter reading data from a water metering signal source within a local area;
an arithmetic means for determining water usage data over data intervals from the plurality of signals representing meter reading data;
a storage means for storing the water usage data corresponding to a data interval within a longer data profiling interval;
a port means for reading out the water usage data corresponding to a data profiling interval; and
transmitter circuitry configured for transmitting a first plurality of radio frequency meter reading signals, at a power level that is greater than 1 milliwatt, as signals that can be received by the mobile network receiver; and
wherein a power source is self-contained within the utility meter transmitter unit with a capacity for supplying power required for operation of the transmitter within a range from greater than 1 milliwatt up to and including one watt.

22. The water meter transmitter unit as recited in claim 21, wherein the plurality of radio frequency meter reading data signals are transmitted by the transmitter circuitry in a frequency-hopping, spread-spectrum mode of transmission for a number of channels from 25 to 50 channels at power level above 1 milliwatt but no greater than ¼ watt.

23. The water meter transmitter unit as recited in claim 22 wherein the communication of data is one-way from the metering site to the mobile network receiver.

24. The water meter transmitter unit comprising of claim 1, wherein the water meter transmitter unit is configured to be installed in a subsurface enclosure apart from any building.

25. The water meter transmitter unit comprising of claim 24, wherein the automatic meter reading network utilizes a walk-by or vehicle-carried mobile receiver.

26. The method of claim 8, wherein the water meter is installed in a subsurface enclosure apart from any building.

27. The method of claim 26, wherein the automatic meter reading network utilizes a walk-by or vehicle-carried mobile receiver.

28. The utility meter transmitter unit of claim 21, wherein the utility meter transmitter unit is adapted to be installed in a subsurface enclosure apart from any building.

29. The utility meter transmitter unit of claim 28, wherein the automatic meter reading network utilizes a walk-by or vehicle-carried mobile receiver.

* * * * *